US009716257B2

(12) United States Patent
Kong et al.

(10) Patent No.: US 9,716,257 B2
(45) Date of Patent: Jul. 25, 2017

(54) ADJUSTABLE BATTERY LOCK DEVICE AND METHOD

(71) Applicant: HONEYWELL INTERNATIONAL INC., Morristown, NJ (US)

(72) Inventors: Valley Kong, Shanghai (CN); Kevin Xiaoshan, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 270 days.

(21) Appl. No.: 14/663,822

(22) Filed: Mar. 20, 2015

(65) Prior Publication Data

US 2016/0276634 A1    Sep. 22, 2016

(51) Int. Cl.
*H01M 2/00* (2006.01)
*H01M 2/10* (2006.01)

(52) U.S. Cl.
CPC ...... *H01M 2/1027* (2013.01); *H01M 2220/30* (2013.01)

(58) Field of Classification Search
CPC ............ H01M 2/1027; H01M 2/1033; H01M 2/1022; H01M 2220/30
USPC ................................................. 248/500, 551
See application file for complete search history.

(56) References Cited

U.S. PATENT DOCUMENTS

| 8,556,303 B2* | 10/2013 | Rajagopal | E05C 3/122 292/11 |
| 2004/0038088 A1* | 2/2004 | Suto | H01M 2/1027 429/9 |
| 2010/0028763 A1* | 2/2010 | Zhou | H04M 1/0262 429/100 |

* cited by examiner

*Primary Examiner* — Anita M King
(74) *Attorney, Agent, or Firm* — Husch Blackwell LLP

(57) ABSTRACT

A battery locking device and method are provided, wherein the devices comprises a shaft, a rotatable latch, a deformable biasing member, and a stop member. The rotatable latch extends between a proximal portion carried on the shaft and a distal portion opposite of the proximal portion at a distance from the shaft. The proximal portion has opposing first and second ends with the first end having a cylindrical projection with a splined outer profile comprising a plurality of spaced-apart teeth. The distal portion has a configuration for engaging at least a portion of a battery. The deformable biasing member is carried on the shaft adjacent the second end of the proximal portion of the rotatable latch. The stop member is positioned adjacent the cylindrical projection and has a free end engagable with the splined outer profile to prevent rotation of the rotatable latch about the shaft in a first direction.

20 Claims, 5 Drawing Sheets

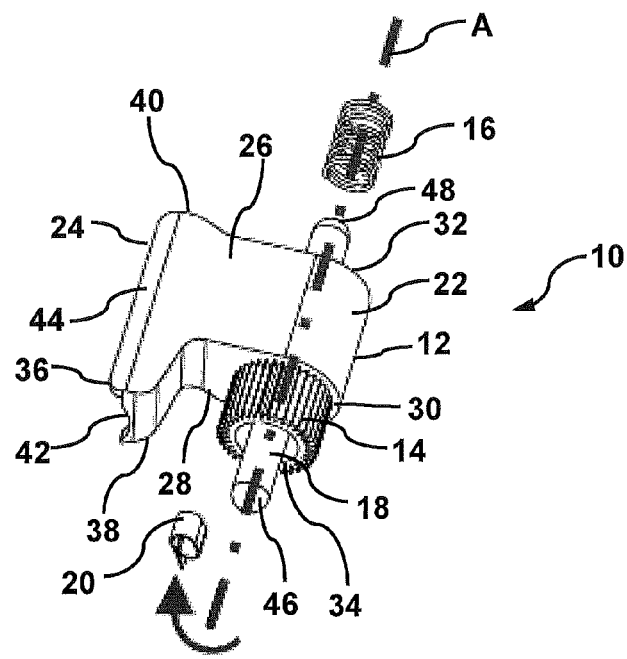
Fig. 2A
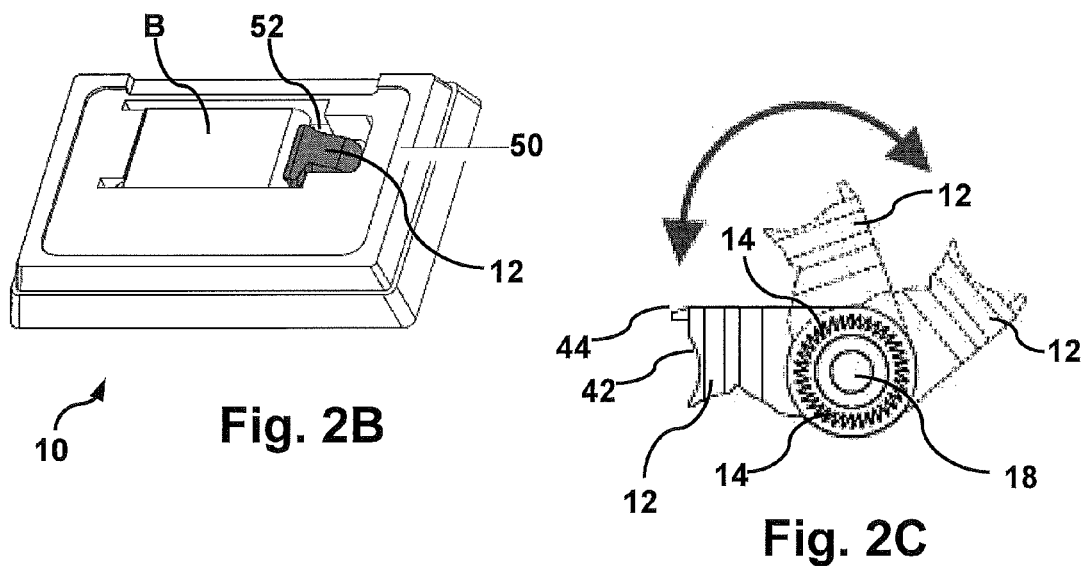
Fig. 2B
Fig. 2C

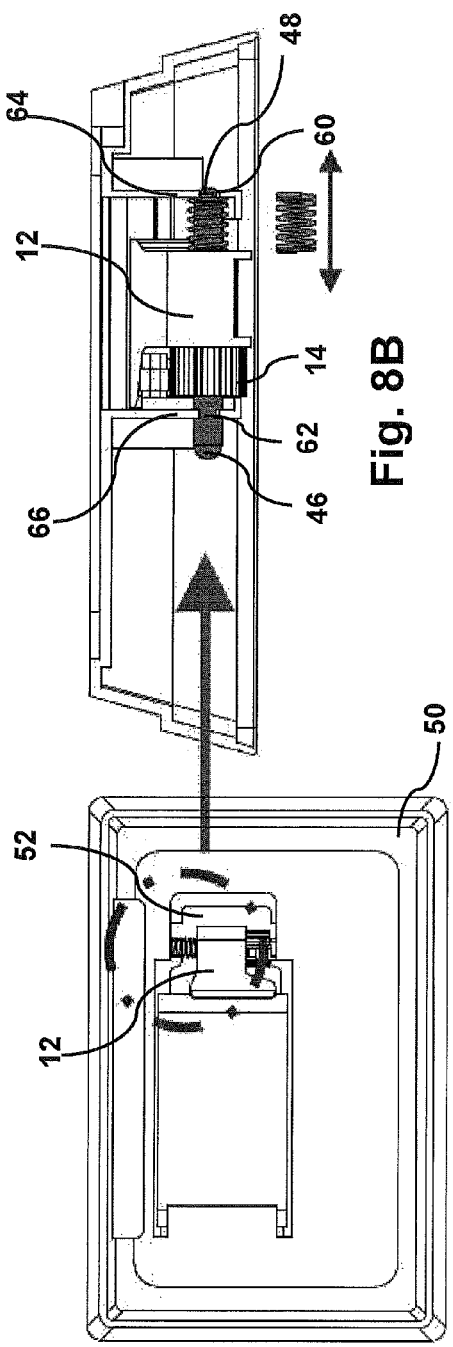
Fig. 8A
Fig. 8B
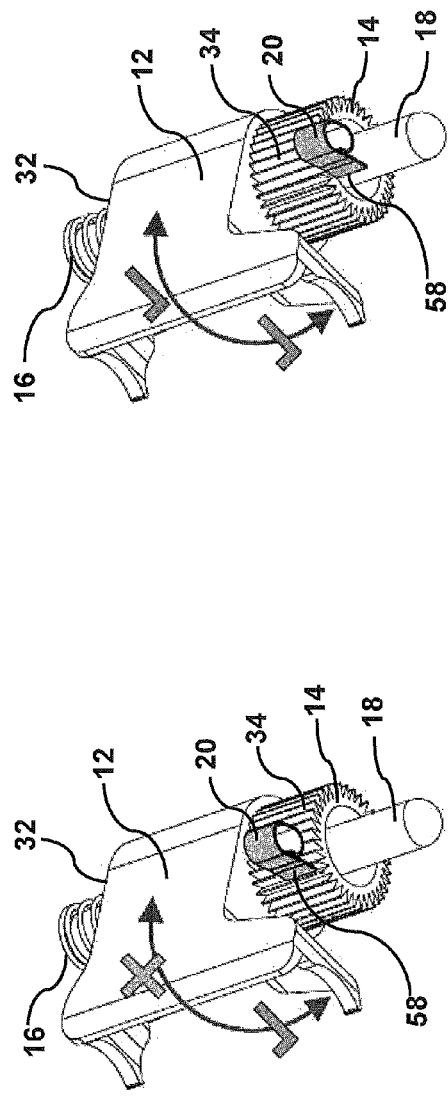
Fig. 8C
Fig. 8D

ADJUSTABLE BATTERY LOCK DEVICE AND METHOD

FIELD

Embodiments disclosed herein pertain generally to a device and a method for securing a battery inside of a battery holder or compartment and, more particularly, to such a device that can be adjusted to accommodate batteries of different sizes or shapes.

BACKGROUND

It is generally well-known that numerous different types of batteries are in existence and that many of such different battery types have different sizes, shapes, and overall dimensions. In light of this, manufacturers of portable electronic devices typically preselect a particular battery type for use in connection with powering the device and further design a complimentary battery housing or compartment for the device in order to accommodate the preselected battery type. As a result, most portable electronic devices are compatible with only a single battery type and will not be able to accommodate batteries of different sizes or shapes.

For a variety of reasons, a user of an electronic device may prefer or need to use a specific type of battery that is not consistent with the battery type preselected for the electronic device by the manufacturer. Thus, the pre-designation of a unitary battery type by a manufacturer can be troublesome to a user.

In an effort to accommodate for this issue, a battery assembly design as shown in FIG. 1 has been previously provided. This design includes a battery holder having multiple screw columns of varying heights and/or locations and a clip/cover that can be removably secured to the screw columns. The height and location of the screw columns can be configured to and correspond to accommodate the dimensions of different sized batteries. Thus, in order for the battery housing to accommodate different sized batteries, the clip/cover can be unscrewed from the column and moved to an alternate column that provides sufficient depth and reach for the clip/cover to accommodate an alternately sized battery.

Such designs, however, have several disadvantages. For example, to change the battery size, the clip/cover and the fastener holding the clip/cover to the column have to be entirely removed from the column. Such a process can be time consuming and can lead to the clip/cover or the fastener getting misplaced. In addition, to accommodate multiple different sized batteries, multiple columns are generally required. Such a configuration, however, can lead to increased manufacturing costs and can result in confusion to a user in trying to select the correct column for securing a particularly sized battery. Thus, an alternate design is needed that is easy, quick, and convenient to use and that can further be easily manufactured/assembled at a reasonable cost.

BRIEF DESCRIPTION OF THE DRAWINGS

FIG. 2A is a partially exploded perspective view of a battery lock device according to embodiments presented herein.

FIG. 2B is an elevation view of the battery lock device shown in FIG. 2A illustrating different points of rotation.

FIG. 2C is a perspective view of a battery housing/compartment illustrating the battery lock device securing a battery within the housing.

FIG. 8A is an end sectional view of a battery housing/compartment illustrating the battery locking device.

FIG. 8B is a top plan view, in partial cut away, of a battery housing/compartment illustrating the location of the biasing member FIG. 8C is a perspective view of the battery locking device in an unbiased release position.

FIG. 8D is a perspective view of the battery locking device in a biased locked position.

DETAILED DESCRIPTION

Figure 1:
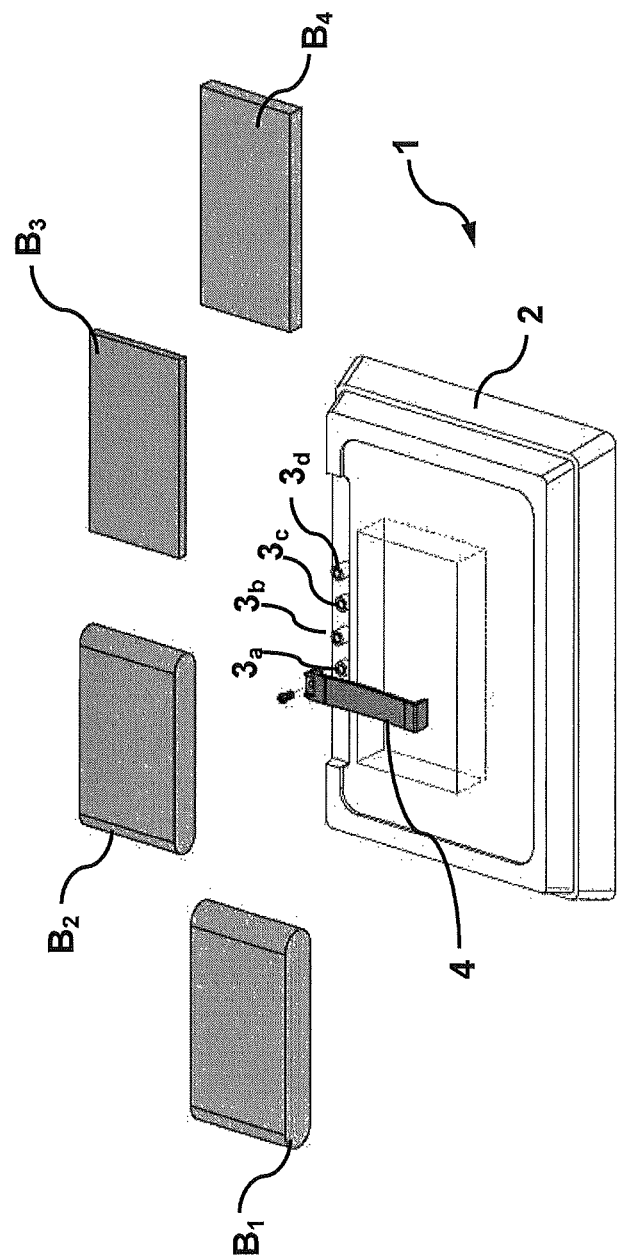
FIG. 1 is a perspective view of a prior art adjustable battery lock design.

While the subject matter disclosed herein is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Embodiments presented herein are directed to an adjustable battery lock device and method that can secure batteries of different sizes, shapes, or dimensions within a battery housing or compartment. For reference purposes, FIG. 1 illustrates an adjustable battery housing assembly 1 according to the prior art. Such devices generally include a battery housing or compartment 2 having multiple attachment columns 3a . . . 3d positioned alongside a socket where a battery $B_1$ . . . $B_4$ can be held. Such devices additionally include a removable clip or cover 4 for holding the battery within the socket. The clip/cover 4 can be removably secured to the attachment columns 3a . . . 3d. Thus, in order to modify such a device 1 to accommodate different sized batteries, one must remove the screw or fastener holding the clip/cover 4 to one attachment column, remove the battery (if a battery is present), place a new, different sized battery in the socket, and reattach the clip/cover 4 to a different attachment column with the screw or fastener. As described above, this process can be time consuming and can result in the clip/cover getting lost or damaged upon being removed from the housing 2.

Embodiments described herein are an improvement over such known devices and can provide a more effortless and less time consuming approach to reconfiguring a battery holder in order to accommodate batteries of different sizes or shapes. In particular, a battery lock device is provided that can have a spring-loaded rotatable retention latch that can be rotationally secured into different positions for securing different sized batteries within a battery housing or compartment. According to such embodiments, the device can be adjusted to accommodate a different sized battery by sliding the latch from a rotationally secured position into a release position in which it can freely rotate to release the battery from the holder. The battery within the holder can then be replaced with a battery having a different size or shape, and the retention latch can be rotated into a locked position for engaging a portion of the new battery. Thus, it will be recognized that such embodiments do not require the removal or detachment (and subsequent reattachment) of any components in order to accommodate a different type of battery. Persons of ordinary skill in the art will appreciate that such embodiments are a novel improvement over known lock devices.

FIGS. 2-8 illustrate an adjustable battery lock device 10 according to embodiments presented herein. FIG. 2A illustrates that the device 10 can include a rotatable retention latch 12 featuring a portion having a cylindrical gear or splined projection 14 for securing the retention latch 12 in a plurality of positions about a central axis A. The device 10 can additionally include a deformable biasing member 16, such as, for example, a coiled spring and an elongated axle, pin, or shaft 18 carrying the retention latch 12 and the spring 16. The device 10 can further include a stop member 20 that can engage the gear/splined portion of the latch 12 and releasably secure the latch 12 to prevent it from rotating about the central axis A.

As illustrated in FIG. 2A, the retention latch 12 can have a proximal end 22 that can receive and/or be secured to the shaft 18 and a distal end 24 extending away from the proximal end 22 and the shaft 18. The latch can have opposing sides 26, 28, and the proximal end 22 of the latch 12 can feature opposing ends 30, 32 with one end 30 being adjacent to the substantially cylindrical gear or splined projection 14.

The cylindrical gear or splined projection 14 can feature an outer circumferential surface having a splined profile 34 comprised of a plurality of spaced apart ridges or teeth that can project substantially radially outward with spaces therebetween. The ridges or teeth can extend along the length of the gear or splined projection 14 in a direction substantially parallel to the central axis A. The ridges or teeth can encircle the entire outer circumference of the gear or splined portion 14 or can be disposed only along a portion of the outer surface of the gear or splined portion 14. Preferably, the splined profile 34 can include thirty six equally spaced teeth around the entire outer surface of the gear or splined projection 14. Thus, according to such embodiments, turning or rotating the latch 12 between adjacent teeth on the gear 14 would rotate the gear 14 (and the latch 12) at an angle of substantially ten degrees around the central axis A. FIG. 2B illustrates the latch 12 being rotated into different positions about the central axis A.

The distal end 22 of the latch 12 can include a bracket 36 for engaging at least a portion of a battery. The size, shape, and features of the bracket 36 can be configured to accommodate particular battery sizes, shapes, and/or dimensions. For example, for purposes of illustration, embodiments illustrated herein are shown and described as featuring a bracket 36 having a configuration for use with substantially rectangular batteries, such as a Lithium-ion or Nickel-cadmium batteries of varying dimensions. According to such embodiments, the bracket 36 can include opposing arms 38, 40 with ends 42 having a partially inwardly curved or concave shape. The bracket 36 can further include a flange 44 along one side 26 of the latch 12 that can extend over and between the arms 38, 40. Accordingly, the arms 38, 40 and the flange 44 can be sized and shaped to be able to engage at least a portion of an end of the battery with a portion of the battery secured against the underside of the flange 44 and between the opposing arms 38, 40.

It will be understood, however, by persons of ordinary skill in the art that embodiments disclosed herein can be configured and used with different battery types and batteries having alternate shapes, sizes, or dimensions, including, for example, circular and/or cylindrical batteries or battery packs. Accordingly, the bracket 36 can have alternate or additional features and configurations to what is shown in the accompanying figures. In addition, as described more fully below, in addition to engaging a battery against the flange 44 and the opposing arms 38, 40, the retention latch 12 can provide alternative arrangements to secure a battery inside of a battery holder.

As illustrated in FIG. 2A, the shaft 18 can have opposing ends 46, 48 and a length therebetween. The shaft 18 can be affixed or extend through the proximal end 22 and the gear portion 14 of the latch 12 such that the latch 12 is positioned at a location along the length on the shaft 18 between the opposing ends 46, 48. The biasing member or spring 16 can also be located on the shaft 18 adjacent to the side 32 of the latch 12 opposite the gear portion 14. The spring 16 can be coiled around a portion of the length of the shaft 18 such that the shaft 18 extends through the spring 16.

FIG. 2C illustrates the lock device 10 securing a battery B within a battery holder or compartment 50. As can be seen, the battery holder 50 can include a recessed socket 52 for receiving the battery B. The retaining latch 12 can extend into a portion of the socket 52 and engage at least a portion of one end of the battery B with the opposing end of the battery B being positioned against a portion of the socket 52 opposite the latch 12. The holder 50 can additionally include a cover or lid (not shown) that can extend over the socket to conceal the battery B and the latch 12 and to further protect the battery B and the latch 12 from external elements that could cause damage to the battery B or the latch 12. It will be understood that the socket 52 can have alternate shapes or configurations and that the latch 12 can be located at alternate positions within the socket 52 without departing from the novel scope of the subject invention.

FIGS. 3-6 illustrate different arrangements in which the locking device 10 can engage and secure different sized batteries $B_1 \ldots B_4$ within the battery housing 50. As illustrated in FIGS. 3A, 4A, 5A and 6A, the socket 52 of the battery holder can have a sufficient depth to accommodate the batteries $B_1 \ldots B_4$ having varying thicknesses or heights. The socket 52 can include a substantially flat raised portion or platform 54 for supporting one of the batteries $B_1 \ldots B_4$ and a recessed portion 56 adjacent to the platform 54 for supporting the retaining latch 12. Thus, when inserted into the socket 52, one of the batteries $B_1 \ldots B_4$ can have one side resting against the platform 54 and an exposed side facing the opposite direction. The battery $B_1 \ldots B_4$ can also have one end adjacent to and in contact with at least a portion of the latch 12 and an opposite end positioned against a portion of the socket 52 or the holder 50.

Figure 3A:
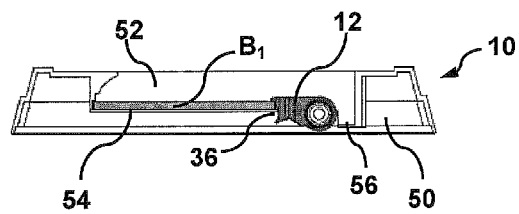
FIG. 3A is a sectional view of a battery housing/compartment with the lock device in a first position for accommodating a first-sized battery.
Figure 3B:
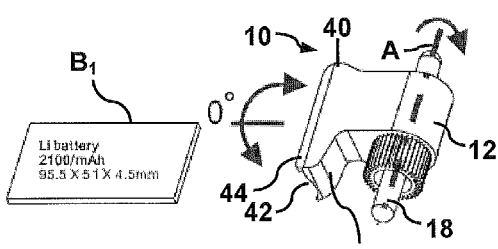
FIG. 3B is a perspective view of the battery and lock device of FIG. 3A.

FIGS. 3A and 3B illustrate the locking device 10 in a first position for engaging and securing a substantially rectangular battery $B_1$ having dimensions, for example, on the order of 95.5 mm×51 mm×4.5 mm. In this arrangement, the retaining latch 12 can be secured at a rotational position about the central axis A such that the latch 12 extends in a direction that is substantially parallel to the platform 54. In this position, the flange 44 of the bracket 36 can extend over at least a portion of the exposed side of the battery $B_1$ and hold the $B_1$ battery against the platform 54. The end of the battery $B_1$ adjacent to the latch 12 can additionally be secured against portions of the inwardly curved ends 42 of the opposing arms 38, 40. Thus, the battery $B_1$ can be secured between the ends 42 of the opposing arms 38, 40 and a structure at the opposing end of the socket 52 opposite the latch 12.

Figure 4A:
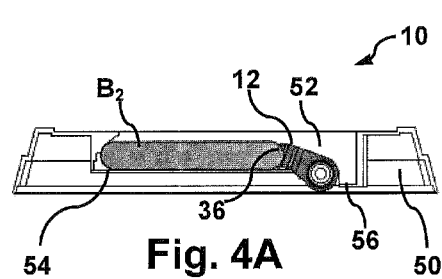
FIG. 4A is a sectional view of a battery housing/compartment with the lock device in a second position for accommodating a second-sized battery.
Figure 4B:
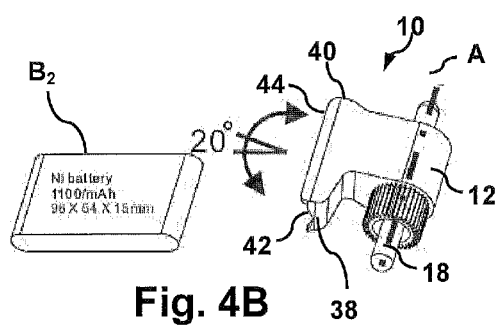
FIG. 4B is a perspective view of the battery and lock device of FIG. 4A.

FIGS. 4A and 4B illustrate the locking device 10 in a second position for engaging and securing a substantially rectangular battery $B_2$ having curved ends and dimensions, for example, on the order of 96 mm×54 mm×15 mm. In this arrangement, the retaining latch 12 can be secured at an angular position about the central axis A such that the latch 12 extends in a direction at an angle of substantially twenty degrees from the direction of the platform 54. In this position, the flange 44 of the bracket 36 can be secured against a point along the curved end of the battery $B_2$ adjacent to the latch 12. The inwardly curved ends 42 of the opposing arms 38, 40 of the bracket 36 can additionally contact points along the curved end of the battery $B_2$ adjacent to the latch 12. Thus, the battery $B_2$ can be secured in place between the flange 44 and the ends 42 of the bracket 36 at one end and a structure at the opposing end of the socket 52 opposite the latch 12.

Figure 5A:
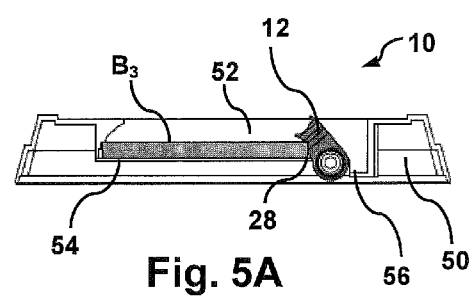
FIG. 5A is a sectional view of a battery housing/compartment with the lock device in a third position for accommodating a third-sized battery.
Figure 5B:
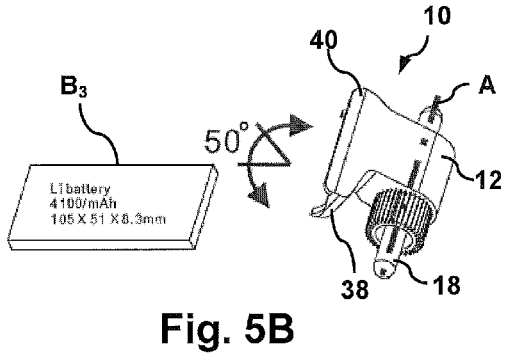
FIG. 5B is a perspective view of the battery and lock device of FIG. 5A.

FIGS. 5A and 5B illustrate the locking device 10 in a third position for engaging and securing a substantially rectangular battery $B_3$ having dimensions, for example, on the order of 105 mm×51 mm×8.3 mm. In this arrangement, the retaining latch 12 can be secured at an angular position about the central axis A such that the latch 12 extends in a direction at an angle of substantially fifty degrees from the direction of the platform 54. In this position, the end of the battery $B_3$ adjacent to the latch 12 can be secured against points along the underside 28 of the opposing arms 38, 40. Such contact points can hold the battery $B_3$ against the platform 54 and can further secure the battery $B_3$ against the opposing end of the socket 52 opposite the latch 12.

Figure 6A:
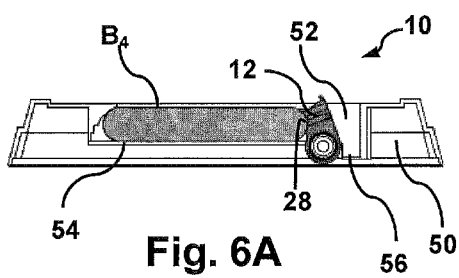
FIG. 6A is a sectional view of a battery housing/compartment with the lock device in a fourth position for accommodating a fourth-sized battery.
Figure 6B:
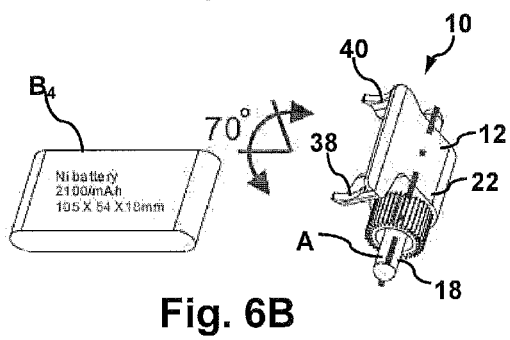
FIG. 6B is a perspective view of the battery and lock device of FIG. 6A.

FIGS. 6A and 6B illustrate the locking device 10 in a fourth position for engaging and securing a substantially rectangular battery $B_4$ with curved ends and dimensions, for example, on the order of 105 mm×54 mm×18 mm. In this arrangement, the retaining latch 12 can be secured at an angular position about the central axis A such that the latch 12 extends in a direction at an angle of substantially seventy degrees from the direction of the platform 54. In this position, the end of the battery $B_4$ adjacent to the latch 12 can be secured against points along the underside 28 of the opposing arms 38, 40 and the proximal end 22 of the latch 12. Such contact points can hold the battery $B_4$ against the platform 54 and can further secure the battery $B_4$ against the opposing end of the socket 52 opposite the latch 12.

According to embodiments presented herein, rotation of the latch 12 in a clockwise direction about the central axis A can cause the bracket 36 to rotate in an upward direction away from the platform 54 where a battery can be inserted. Thus, clockwise rotation of the latch 12 can increase the angle between the latch 12 and the platform 54 to disengage or release the latch 12 from a battery installed in the socket 52 or move the latch 12 into an open position to enable a new battery to be inserted into the socket 52. By contrast, counterclockwise rotation of the latch 12 can rotate the bracket 26 downward towards the platform 54 and can decrease the angle between the latch 12 and the platform 54. Accordingly, rotation of the latch 12 in a counterclockwise direction can engage the latch 12 to a portion of the battery and/or further tighten such engagement. Notwithstanding, persons of ordinary skill in the art will understand that the lock device 10 can be alternatively configured such that clockwise rotation can lower the bracket 36 and that counterclockwise rotation can open or raise the bracket 36 without departing from the novel scope of the subject invention.

Figure 7A:
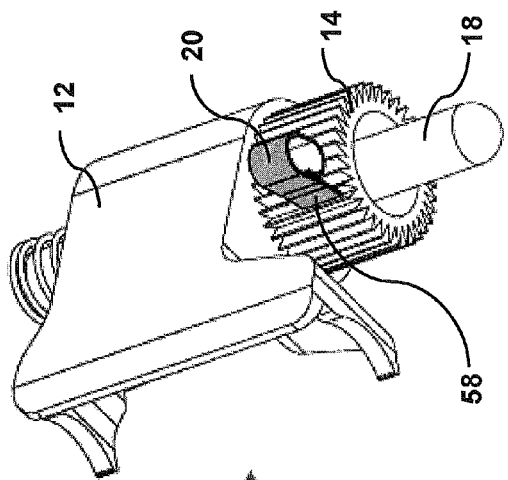
FIG. 7A is a perspective view of the battery locking device illustrating the stop member operatively connected to the gear.
Figure 7B:
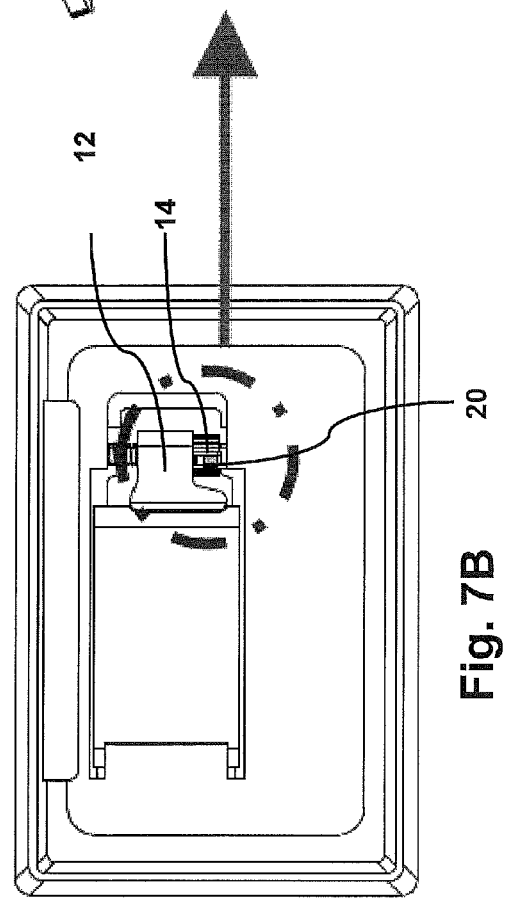
FIG. 7B is a top plan view, in partial cut away, of a battery housing/compartment illustrating the stop member.
Figure 7C:
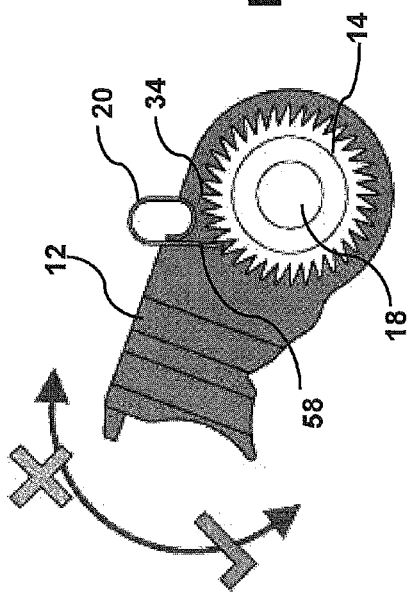
FIG. 7C is a sectional view of the battery locking device illustrating the stop member operatively connected to the gear.

FIGS. 7A-7C illustrate the stop member 20 according to embodiments presented herein. The stop member 20 can releasably secure the latch 12 so that it is prevented from freely rotating in a direction that raises or opens the latch 12. The stop member 20 can be comprised of a strong, flexible material, such as, for example, a role of sheet steel. The stop member 20 can be positioned adjacent to the gear or splined projection 14 of the latch 12 and have a free end 58 that can extend into a groove between adjacent ridges or teeth of the splined profile 34. The free end 58 can have a planar configuration extending substantially parallel to the direction of the teeth and groves of the splined profile 34.

The stop member 20 can provide one-way rotation of the latch 12 about the central axis A in order to prevent the latch 12 from rotating upward away from the platform 54 into an open position that can release or disengage the battery. This can be accomplished, for example, by the location of the stop member 20 relative to the gear or splined projection 14 and the configuration of the splined profile 34 around the outer surface of the projection 14. Accordingly, where the stop member 20 is operatively connected to and/or engaged with the splined profile 34, the free end 58 engages the teeth to restrict rotation of the latch 12 in a clockwise direction. By contrast, the stop member 20 can enable the latch 12 to be rotated in a counterclockwise direction by passing over the top of the teeth. Such counterclockwise rotation can be allowed to progress until the latch 12 is tightened against a battery to the maximum extent possible or rotated into the lowest possible position in the socket.

FIGS. 8A-8D illustrate embodiments that can provide for releasing engagement of the stop member 20 and allow for removal of a battery. According to such embodiments, the shaft 18 can be supported in the battery holder 50 by holes 60, 62 in opposing sides walls 64, 66 of the socket 52 in a position adjacent to the latch 12. The shaft 18 can extend through the holes 60, 62 with the opposing ends 46, 48 of the shaft 18 being located outside of the socket 52. The spring 16 can be positioned between the end 32 of the latch 12 and one of the socket walls 64.

The holes 60, 62 in the socket walls 64, 66 can be sized large enough to allow the shaft 18 to be able to partially slide longitudinally through the holes 60, 62, but small enough to restrict the spring 16 or the latch 12 from passing through. Thus, the shaft 18 can be permitted to slide in a first direction through the hole 60 until the spring 16 is fully compressed between the end 32 of the latch 12 and the wall 64. The shaft 18 can also be permitted to slide in a second direction through the hole 62 until the gear or splined projection 14 contacts the wall 66.

FIG. 8C illustrates the locking device 10 with the deformable spring 16 in an uncompressed and unbiased position. In this position, the stop member 20 is positioned over the gear or splined projection 14 of the latch 12, thereby engaging the splined profile 34 and preventing the latch 12 and the shaft 18 from rotating in a clockwise direction.

FIG. 8D illustrates the locking device 10 as it would appear if the device were actively moved, pushed, or held into a release position. As can be seen, in this position, the latch 12 can slide towards the wall 64 such that a greater portion of the shaft 18 passes through the hole 60 and the spring 16 compresses between the end 32 of the latch 12 and the wall 64. In this position, the gear or splined projection 14 of the latch 12 slides out from the stop member 20 such that the free end 58 of the stop member 20 is no longer engaged within the grooves of the splined profile 34. Thus, the latch 12 and the shaft 18 are able to freely rotate in a clockwise direction to open or release the latch 12. Since the spring 16 has a natural tendency to uncoil, the position illustrated in FIG. 8D generally requires active manipulation or force, and when such force is removed, the locking device can snap or return back to the position shown in FIG. 8C.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A battery locking device comprising:
a support shaft having a first shaft end and a second shaft end and a length therebetween, the support shaft providing a substantially central axis of rotation;
a latch rotatably mounted in a first position along the length of the support shaft, the latch being rotatable with the support shaft about the central axis of rotation, the latch having opposing first and second sides and extending between a proximal portion carried on the support shaft and a distal portion located opposite of the proximal portion at a distance from the support shaft, the distal portion configured to engage a battery, the proximal portion having opposing first and second proximal ends, the first proximal end having a cylindrical projection with an outer surface having a splined profile comprising a plurality of spaced-apart teeth radially extending from the outer surface of the cylindrical projection, each of the plurality of spaced-apart teeth having a respective length extending substantially parallel to the central axis of rotation;
a deformable biasing member carried on the support shaft adjacent the second proximal end of the proximal portion of the latch; and
a stop member positioned adjacent the cylindrical projection, the stop member having a free stop end engagable with the splined profile to prevent rotation of the latch and the support shaft about the central axis of rotation in a first direction.

2. The battery locking device of claim 1 wherein the latch is rotatable about the central axis of rotation in a second direction between an open position and a locked position, the second direction being opposite the first direction, the latch being secured against at least a portion of the battery in the locked position, the battery preventing further rotation of the latch in the second direction.

3. The battery locking device of claim 2 wherein the support shaft and the latch are slidable in a third direction along the central axis of rotation from a stopped position where the stop member is engaged with the splined profile into an open position where the stop member is not engaged with the splined profile, the latch being able to rotate in both the first and second directions when in the open position.

4. The battery locking device of claim 2 wherein the locked position depends on a size of the battery, the locked position being different when the size of the battery is different.

5. The battery locking device of claim 1 wherein the distal portion of the latch comprises a support bracket having opposing arms with arm ends having an inwardly curved surface and a flange extending between the opposing arms along the first side of the latch, the flange extending outward past the arm ends of the opposing arms.

6. The battery locking device of claim 1 wherein the deformable biasing member is a helical spring, the helical spring coiled around at least a portion of the support shaft.

7. The battery locking device of claim 1 further comprising a battery holder for securing the battery, the battery holder having side walls defining a recessed socket for receiving the battery and the latch.

8. The battery locking device of claim 7 wherein the recessed socket has a closed end, the closed end having a substantially flat platform for supporting the battery and a recessed portion adjacent the substantially flat platform for supporting the proximal portion of the latch, the substantially flat platform being elevated from the recessed portion.

9. The battery locking device of claim 1 wherein the first direction is clockwise rotation of the latch and the support shaft about the central axis of rotation.

10. The battery locking device of claim 2 wherein the second direction is counterclockwise rotation of the latch and the support shaft about the central axis of rotation.

11. The battery locking device of claim 1 wherein the splined profile comprises thirty six of the plurality of spaced-apart teeth equally spaced about the outer surface of the cylindrical projection, the latch rotating at an angle of ten degrees around the central axis of rotation upon being rotated between adjacent ones of the plurality of spaced-apart teeth.

12. A battery locking device comprising:
a battery holder, the battery holder having side holder walls and a closed end defining a recessed socket for receiving a battery;
a support shaft extending through a portion of the recessed socket, the support shaft having a first shaft end and a second shaft end and a length therebetween, the support shaft providing a substantially central axis of rotation;
a latch rotatably mounted in a fixed position along the length of the support shaft, the latch being rotatable about the central axis of rotation with the support shaft, the latch having opposing first and second sides and extending between a proximal portion carried on the support shaft and a distal portion located opposite of the proximal portion at a distance from the support shaft, the distal portion configured to engage the battery, the proximal portion having opposing first and second proximal ends, the first proximal end having a cylindrical projection with an outer surface having a splined profile comprising a plurality of spaced-apart teeth radially extending from the outer surface of the cylindrical projection, each of the plurality of spaced-apart teeth having a respective length extending substantially parallel to the central axis of rotation;

a deformable helical spring carried on the support shaft adjacent the second proximal end of the proximal portion of the latch; and a stop member positioned adjacent the cylindrical projection, the stop member having a free stop end engagable with the splined profile to prevent rotation of the latch about the central axis of rotation in a first direction.

13. The battery locking device of claim 12 wherein opposing side socket walls of the recessed socket have holes for slidably supporting the support shaft, the support shaft extending through the holes and length being greater than a distance between the opposing side socket walls, the support shaft and the latch being slidable in a second direction along the central axis of rotation from a first position where the stop member is engaged with the splined profile into a second position where the stop member is not engaged with the splined profile, the latch being rotatable about the central axis of rotation in both clockwise and counterclockwise directions upon being moved into the second position.

14. The locking device of claim 12 wherein the distal portion of the latch comprises a support bracket having opposing arms with arm ends having an inwardly curved surface and a flange extending between the opposing arms along the first side of the latch, the flange extending outward past the arm ends of the opposing arms.

15. The locking device of claim 12 wherein the closed end of the recessed socket has a substantially flat platform for supporting the battery and a recessed portion adjacent the substantially flat platform for supporting the proximal portion of the latch, the substantially flat platform being elevated from the recessed portion.

16. The locking device of claim 12 wherein the latch is securable in a locked position, the latch being located at a particular rotational position about the central axis of rotation in the locked position, the battery preventing the latch from rotating counterclockwise about the central axis of rotation in the locked position, the stop member preventing the latch from rotating clockwise about the central axis of rotation in the locked position, and the particular rotational position of the latch in the locked position being different for the battery with a different size.

17. A method comprising:
providing a battery lock device having a retaining latch rotatably mounted to an elongated support shaft;
preventing the retaining latch from rotating about the elongated support shaft in a first direction when the retaining latch and the elongated support shaft are in a first position;
sliding the retaining latch and the elongated support shaft along a central axis from the first position to a second position whereupon the retaining latch is free to rotate about the elongated support shaft in the first direction, the sliding compressing a deformable biasing member into a biased state;
returning the retaining latch and the elongated support shaft to the first position under influence from the deformable biasing member returning to an unbiased state; and
rotating the retaining latch about the elongated support shaft in a second direction and into a locked position where a portion of the retaining latch is secured against an adjacent battery.

18. The method of claim 17 further comprising inserting a portion of a stop member between adjacent teeth along a portion of the retaining latch having a splined outer profile when the retaining latch is in the first position and engaging the splined outer profile to prevent the retaining latch from rotating about the elongated support shaft in the first direction.

19. The method of claim 17 further comprising supporting the adjacent battery in a battery holder having the battery lock device.

20. The method of claim 17 wherein rotating the retaining latch into the locked position secures the adjacent battery in a socket of a battery housing.

* * * * *